(12) United States Patent
Dhariwal et al.

(10) Patent No.: US 11,260,625 B2
(45) Date of Patent: Mar. 1, 2022

(54) BIODEGRADABLE AND COMPOSTABLE MULTILAYER FILM

(71) Applicant: CREATIVE PLASTICS, Pune (IN)

(72) Inventors: Prakash Rasiklal Dhariwal, Pune (IN); Milind Ganesh Bhole, Pune (IN); Sharad Shrikant Kulkarni, Pune (IN)

(73) Assignee: Creative Plastics., Pune (IN)

( * ) Notice: Subject to any disclaimer, the term of this patent is extended or adjusted under 35 U.S.C. 154(b) by 305 days.

(21) Appl. No.: 16/303,620

(22) PCT Filed: May 9, 2017

(86) PCT No.: PCT/IB2017/052687
§ 371 (c)(1),
(2) Date: Nov. 20, 2018

(87) PCT Pub. No.: WO2017/203378
PCT Pub. Date: Nov. 30, 2017

(65) Prior Publication Data
US 2019/0315096 A1  Oct. 17, 2019

(30) Foreign Application Priority Data
May 23, 2016 (IN) .............................. 201621017682

(51) Int. Cl.
*B32B 15/09* (2006.01)
*B29C 48/00* (2019.01)
(Continued)

(52) U.S. Cl.
CPC .......... *B32B 15/09* (2013.01); *B29C 48/0014* (2019.02); *B29C 48/0017* (2019.02);
(Continued)

(58) Field of Classification Search
None
See application file for complete search history.

(56) References Cited

U.S. PATENT DOCUMENTS 7,160,977 B2 *  1/2007  Hale ................. C08L 67/02
                                              264/176.1
9,181,010 B2  11/2015  Penttinen et al.
(Continued)

FOREIGN PATENT DOCUMENTS

CN    103627151 A    3/2014
CN    104109361 A   10/2014
(Continued)

OTHER PUBLICATIONS

PCT Search Report & Written Opinion for PCT/IB2017/052687 filed on May 9, 2017 in the name of Creative Plastics entitled A Biodegradable and Compostable Multilayer Film dated Jul. 24, 2017; 12 pages.

*Primary Examiner* — Vivian Chen
(74) *Attorney, Agent, or Firm* — Fish IP Law, LLC

(57) ABSTRACT

The present disclosure provides a biodegradable and compostable multilayer film. The biodegradable and compostable multilayer film comprises a sealant product side layer comprising at least one slip additive and having a pre-determined co-efficient of friction, an outer surface layer, and at least one intermediate layer disposed between the sealant product 5 side layer and the outer surface layer. The biodegradable and compostable multilayer film of the present disclosure has good mechanical properties and is non-reactive with tobacco based products, medicines, and food products to be packaged.

13 Claims, 1 Drawing Sheet

Figure 1:
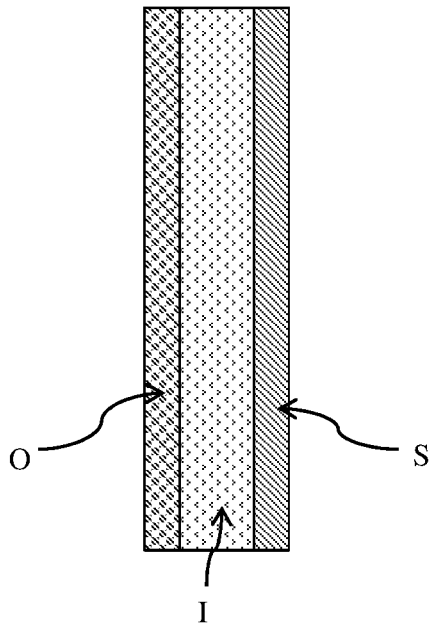

(51) Int. Cl.
*B29C 48/18* (2019.01)
*B32B 15/20* (2006.01)
*C08K 5/20* (2006.01)
*C08L 67/02* (2006.01)
*C08L 67/04* (2006.01)
*B29C 48/335* (2019.01)
*B29C 48/305* (2019.01)
*B29C 48/30* (2019.01)
*B29C 48/16* (2019.01)
*B32B 37/15* (2006.01)

(52) U.S. Cl.
CPC .............. *B29C 48/18* (2019.02); *B32B 15/20* (2013.01); *C08K 5/20* (2013.01); *C08L 67/02* (2013.01); *C08L 67/04* (2013.01); *B29C 48/16* (2019.02); *B29C 48/30* (2019.02); *B29C 48/305* (2019.02); *B29C 48/307* (2019.02); *B29C 48/335* (2019.02); *B29C 48/3363* (2019.02); *B32B 37/15* (2013.01); *B32B 37/153* (2013.01); *B32B 2250/04* (2013.01); *B32B 2250/05* (2013.01); *B32B 2255/205* (2013.01); *B32B 2307/7163* (2013.01); *B32B 2307/746* (2013.01); *C08L 2201/06* (2013.01); *C08L 2203/16* (2013.01); *C08L 2205/02* (2013.01); *Y10T 428/31681* (2015.04); *Y10T 428/31786* (2015.04)

(56) References Cited

U.S. PATENT DOCUMENTS

| | | | | |
|---|---|---|---|---|
| 2002/0150775 | A1* | 10/2002 | Ishikawa | C23C 14/20 428/458 |
| 2005/0084637 | A1* | 4/2005 | Nishizawa | G09F 3/04 428/35.7 |
| 2005/0244606 | A1* | 11/2005 | Egawa | C08L 67/02 428/98 |
| 2006/0286373 | A1* | 12/2006 | Egawa | C08L 67/02 428/339 |
| 2007/0037912 | A1* | 2/2007 | Mohanty | C08L 2666/18 524/445 |
| 2010/0038822 | A1* | 2/2010 | Wang | B29C 48/919 264/294 |
| 2010/0323196 | A1* | 12/2010 | Dou | B32B 27/18 428/349 |
| 2010/0324220 | A1* | 12/2010 | Toyohara | C08L 67/02 525/183 |
| 2010/0330382 | A1* | 12/2010 | Dou | B32B 27/36 428/457 |
| 2011/0160364 | A1* | 6/2011 | Toyohara | C08L 67/04 524/117 |
| 2013/0122280 | A1* | 5/2013 | Yokota | C08K 5/5317 428/318.6 |
| 2014/0073745 | A1* | 3/2014 | Bailey | B65D 65/466 525/411 |
| 2015/0376373 | A1* | 12/2015 | Shoji | C08K 5/29 525/450 |
| 2016/0251496 | A1* | 9/2016 | Ono | C08K 5/29 524/195 |
| 2016/0271909 | A1* | 9/2016 | Coupin | B65D 65/40 |
| 2017/0037241 | A1* | 2/2017 | Schmidt | C08L 67/02 |
| 2018/0142073 | A1* | 5/2018 | Wu | C08J 7/056 |
| 2018/0207917 | A1* | 7/2018 | Patel | B32B 1/02 |
| 2019/0194450 | A1* | 6/2019 | Coupin | C08L 53/00 |

FOREIGN PATENT DOCUMENTS

| | | |
|---|---|---|
| JP | 2007076139 | 3/2007 |
| JP | 4220080 | 4/2009 |
| JP | 2009067011 A | 4/2009 |
| JP | 2013541447 | 11/2013 |

* cited by examiner

○ - 1  ◉ - 2  ▩ - 3

BIODEGRADABLE AND COMPOSTABLE MULTILAYER FILM

FIELD

The present disclosure relates to polymeric films, particularly, that are biodegradable and compostable, useful in packaging of tobacco based products, and in pharmaceutical and food industry.

Definitions

As used in the present disclosure, the following terms are generally intended to have the meaning as set forth below, except to the extent that the context in which they are used indicate otherwise.

Sealant Product side layer: In the context of the multilayer film of the present disclosure it is defined as that layer being in direct contact with the product or any material which is packaged using the multilayer film of the present disclosure.

Co-efficient of friction (C.O.F): Defined as the force of friction between the film surface and metal surface when the film moves on a metal surface or between the film to film surface of a multilayer film when the film slides over the other film surface and vice versa. Coefficient of friction is also a measure of the surface roughness of a film.

Inter layer adhesion and or bond strength: The adhesion or bond strength is designed in a manner that the bond is indestructible and layers are inseparable under functional conditions.

Slip additive: Slip additives are compounds added to polymers to reduce their surface co-efficient of friction and allow for easy movement of the polymeric films over surfaces.

Biodegradability: Biodegradability refers to the ability of materials to completely break down and decompose into natural elements by biological means. These materials can be solids biodegrading into the soil or liquids biodegrading into water. A biodegradable plastic is intended to break up in the presence of microorganisms.

Compostability: Compostability refers to the ability of materials to break down to nutrient rich mass (humus) in a short span of time when provided with composting conditions.

Pharmaceutical and Food grade polymeric films: Pharmaceutical and Food grade polymeric films are made from special pure and virgin polymers to ensure that the packaged products are not contaminated by the unreacted monomer content, chemical additives and other impurities present in the normal polymeric films used for other purposes. Particularly, where the polymer/s is/are processed by an online closed loop system, the trims generated during online processing is recycled and reused in the closed loop system without causing any contamination to the produced multilayer film including unreacted monomer content, chemical additives and other impurities. The critical factors like the stringent limits of the amount of unreacted monomer(s), the quantum of chemical additives and their migration rate from the polymeric films to the packaged products meeting the specific requirements for pharmaceutical and food contact polymeric films qualifies their approval for use in packaging of pharmaceutical and food products by the relevant regulatory authorities.

Polymeric films: A polymeric film is a thin continuous polymeric membrane of thickness 300 μm and less.

Polymeric sheet: A polymeric sheet is a thin continuous polymeric membrane of thickness more than 300 μm.

Multilayer film: In the present disclosure, the biodegradable and compostable multilayer film is, also, simply referred to as multilayer film.

Metallized layer: In the context of the present disclosure, it is defined as a layer which can be either deposited or can be a ready to use layer to be laminated over the outer surface layer of the biodegradable and compostable multilayer film.

Grammage: Denotes a measure of the mass of the multilayer film per unit area of the film. Expressed in grams per square meter ($g/m^2$) and/or gsm.

Heat seal strength: Used to determine the force needed to break the seal between the sealed surface in a multilayer film, as well as evaluation of the opening force of the package system prepared from the multilayer film.

Treatment: In the context of the present disclosure, corona treatment and/or plasma treatment is used depending upon the process parameters and/or functional requirement of the multilayer film to achieve the desired surface treatment value, specified in dynes for the multilayer film.

Melt Viscosity: In the context of the present disclosure, melt viscosity is a measure of the viscosity of the polymeric melt obtained from the extrusion process and is expressed in poise.

Melt strength: Melt strength is a measure of the extensional viscosity of the polymeric melt and is defined as the maximum tension that can be applied to the polymeric melt without breaking it.

Co-extrusion stack type die: The stack type die also known as pan cake die, is a disk like structure directly connected to an extruder and the disk has multiple pre countered channel network through which a polymeric melt flows. The number of layers required in the multilayer film decides the number of such discs used and they are insulated from each other to maintained precise differential melt temperature. The residence time is reduced to half in such dies and because of construction of keeping such discs one over another, the die is called stack type die.

BACKGROUND

Biodegradable polymeric films are slowly catching up as a promising substitute to conventional naphtha based non-biodegradable polymers. They are readily degradable in soil and water without producing any harmful waste.

However, in comparison to the conventional naphtha based polymers, biodegradable polymers have been found to lack in mechanical properties. Also, due to their poor melt strength, it is very difficult to carry out melt processing of the biodegradable polymer resins.

There are, however, few biodegradable resins like polylactic acid, modified starches and polyhydroxyalkanoates that have been successfully made into films by appropriate processing of these polymers. However, such films have not been used, particularly, in the packaging of tobacco based products and have been scarcely used in the pharmaceutical and food industry as these films are found to be completely incompatible and non-resistant to corrosive ingredients in medicines, acidic food products and tobacco based products. Also, these films are unable to overcome the challenges of some of the processing methods like co-extrusion and lamination as well as packaging methods like high and ultra high speed form fill seal (FFS) packaging machines having varying sealing mechanisms and systems with requirement of accomplishing the required/desired functional sealability through contamination resulting from product and/or packaging process. There are other resins which, although, having better inertness and mechanical properties, do not exhibit the property of compostability.

Hence, there is a felt need for a film that is, simultaneously, biodegradable and compostable, yet exhibits excellent mechanical properties (like high dimensional stability and high melt strength during processing and packaging operations, and compatibility to products with sharp contours and edges), excellent surface properties (resulting in clarity, printability and appropriate surface tension and slip factor), high tear resistance, inertness and high compatibility towards corrosive ingredients and shows the ability to be use of in the tobacco based products, pharmaceutical and food industry.

Objects

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a biodegradable and compostable multilayer film.

Another object of the present disclosure is to provide a biodegradable and compostable multilayer film suitable for packaging and is non-reactive with the packaged ingredients.

Still another object of the present disclosure is to provide a biodegradable and compostable multilayer film that is useful for packaging of tobacco based products, pharmaceutical and food products.

Yet another object of the present disclosure is to provide a process to prepare a biodegradable and compostable multilayer film.

Other objects and advantages of the present disclosure will be more apparent from the following description, which is not intended to limit the scope of the present disclosure.

SUMMARY

The present disclosure provides a biodegradable and compostable multilayer film. The biodegradable and compostable multilayer film of the present disclosure comprises a sealant product side layer comprising at least one slip additive and having a pre-determined co-efficient of friction, an outer surface layer and at least one intermediate layer disposed between the sealant product side layer and the outer surface layer. Each of the sealant product side layer, the outer surface layer and the intermediate layer can comprise at least one blend independently selected from the group consisting of a first blend of polylactic acid and a copolyester of 1,4-butanediol, adipic acid and terephthalic acid, a second blend of polylactic acid and a copolyester of 1,4-butanediol, adipic acid, and terephthalic acid, a third blend of polylactic acid and a copolyester of 1,4-butanediol, adipic acid, and terephthalic acid, a fourth blend of polylactic acid and a copolyester of 1,4-butanediol, adipic acid, and terephthalic acid, a fifth blend of polylactic acid and a copolyester of 1,4-butanediol, adipic acid, and terephthalic acid and a sixth blend of polylactic acid and a copolyester of 1,4-butanediol, adipic acid, and terephthalic acid wherein, the first blend has a melt temperature in the range of 165° C. to 190° C.; the second blend has a melt temperature in the range of 190° C. to 200° C.; the third blend has a melt temperature in the range of 165° C. to 170° C.; the fourth blend has a melt temperature in the range of 180° C. to 190° C.; the fifth blend has a melt temperature in the range of 175° C. to 195° C.; and the sixth blend has a melt temperature in the range of 180° C. to 200° C. These blends are used in a way that the multilayer film comprises at least two layers each having separately at least one of these blends in an amount in the range of 1 wt % to 99 wt %. The slip additive present in the biodegradable and compostable multilayer film can be selected from the group consisting of erucamide and oleamide in an amount in the range of 0.01 wt % to 10 wt % of each other. The predetermined co-efficient of friction of the sealant product side layer can be in the range of 0.1 to 0.6. The thickness of the biodegradable and compostable multilayer film of the present disclosure can be in the range of 12 μm to 300 μm. Further, the biodegradable and compostable multilayer film can additionally comprise a metallized layer having a thickness in the range of 10 μm to 50 μm laminated over the outer surface layer. In accordance with the present disclosure, the metal of the metallized layer is aluminum. The number of intermediate layers disposed between the outer surface layer and the sealant product side layer of the present disclosure can be in the range of 1 to 9.

Further, a process for manufacturing the biodegradable and compostable multilayer film of the present disclosure is provided. The process for manufacturing the biodegradable and compostable multilayer film of the present disclosure can be at least one selected from the group consisting of blown-film co-extrusion, cast film co-extrusion and hot lamination process.

In accordance with the process for manufacturing the biodegradable and compostable multilayer film, a sealant product side layer extruder, an outer surface layer extruder and at least one intermediate layer extruder is provided to extrude a sealant product side layer extrudate, an outer surface layer extrudate, and at least one intermediate layer extrudate therethrough respectively. At least one blend independently selected the group of the first blend, second blend, third blend, fourth blend, fifth blend, and sixth blend is introduce into each of said sealant product side layer extruder, outer surface layer extruder, and at least one intermediate layer extruder. In the sealant product side layer extruder, at least one slip additive selected from the group consisting of erucamide, and oleamide is also introduced. A sealant product side layer extrudate, an outer surface layer extrudate, and at least one intermediate layer extrudate are obtained by heating said sealant product side layer extruder, outer surface layer extruder, and at least one intermediate layer extruder respectively at a predetermined temperature, wherein the predetermined temperature is in the range of 140° C. to 210° C. for blown film co-extrusion and in the range of 130° C. to 300° C. for cast film co-extrusion.

These extrudates are passed through at least one die selected from the group consisting of co-extrusion stack type die and spiral die to form a biodegradable and compostable multilayer extrudate which is cooled to a temperature in the range of 5° C. to 40° C. to obtain the biodegradable and compostable multilayer film of the present disclosure.

BRIEF DESCRIPTION OF THE ACCOMPANYING DRAWING

Figure 2:
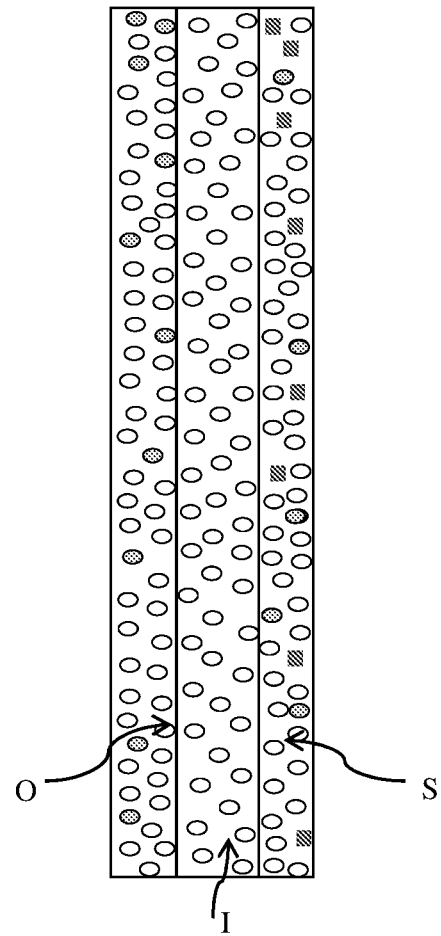

The present disclosure will now be described with the help of the accompanying drawing, in which:

FIG. 1 illustrates a schematic cross sectional view of a three layer biodegradable and compostable film of the present disclosure; and FIG. 2 illustrates a schematic cross sectional view of a three layer biodegradable and compostable film showing its compositional elements.

LIST OF REFERENCE NUMERALS/LETTERS

| Reference Numeral/Letter | Reference |
| --- | --- |
| O | Outer surface layer |
| I | Intermediate layer |
| S | Sealant product side layer |
| 1 | first blend |
| 2 | second blend |
| 3 | slip additive |

DETAILED DESCRIPTION

Polylactic acid is a promising resin being used in the manufacturing of biodegradable and compostable multilayer film. However, at present, the films made of polylactic acid lack the required film and mechanical properties to be used in the packaging of tobacco based products and also for the packaging of pharmaceutical and food products.

The present disclosure, therefore, envisages a biodegradable and compostable multilayer film, having good film and mechanical properties and is non-reactive with the tobacco based products, medicines, and food products to be packaged.

In accordance with one aspect of the present disclosure, there is provided a biodegradable and compostable multilayer film. The biodegradable and compostable multilayer film of the present disclosure can have up to a maximum of 11 layers.

The biodegradable and compostable multilayer film of the present disclosure comprises a sealant product side layer, an outer surface layer and at least one intermediate layer disposed between the sealant product side layer and the outer surface layer. The sealant product side layer can comprise at least one slip additive and can have a predetermined co-efficient of friction such that the inter layer adhesion or bond strength of the biodegradable and compostable multilayer film is indestructible and the layers are inseparable under functional conditions.

In accordance with the present disclosure, each of the sealant product side layer, the outer surface layer and the intermediate layer can comprise at least one blend independently selected from the group consisting of a first blend of polylactic acid and a copolyester of 1,4-butanediol, adipic acid, and terephthalic acid, a second blend of polylactic acid and a copolyester of 1,4-butanediol, adipic acid, and terephthalic acid, a third blend of polylactic acid and a copolyester of 1,4-butanediol, adipic acid, and terephthalic acid, a fourth blend of polylactic acid and a copolyester of 1,4-butanediol, adipic acid, and terephthalic acid, a fifth blend of polylactic acid, and a copolyester of 1,4-butanediol, adipic acid, and terephthalic acid and a sixth blend of polylactic acid and a copolyester of 1,4-butanediol, adipic acid, and terephthalic acid in a way that the multilayer film comprises at least two layers each having separately at least one of the aforementioned blends in an amount in the range of 1 wt % to 99 wt % wherein, the first blend has a melt temperature in the range of 165° C. to 190° C.; the second blend has a melt temperature in the range of 190° C. to 200° C.; the third blend has a melt temperature in the range of 165° C. to 170° C.; the fourth blend has a melt temperature in the range of 180° C. to 190° C.; the fifth blend has a melt temperature in the range of 175° C. to 195° C.; and the sixth blend has a melt temperature in the range of 180° C. to 200° C.

The blends are selected based on their chemistry to ensure that both the chemical and the physical bonding are indestructible which in turn leads to the fusion of all layers thereby resulting in a homogenous and inseparable multilayer film. These blends are also characterized based on their respective material flow characteristics like melt viscosity such that the material movement in the hoppers and extruders in particular, amongst the various equipment, is not only smooth and consistent but also facilitates possibility of material segregation based on at least a few characteristics like the material density of the composite forming the blend. It is observed that the optimum results were obtained when the material density is in the range of 1.22 to 1.28 µm per cc.

Further, the melt strength of these blends is adequately balanced so as to provide appropriate inherent strength to promote and sustain a stable bubble formation on the blown film line in particular. This necessitates the balancing of the formulation on the basis of the melting characteristics of the individual resins in the blend. The specially designed screws and the low pressure dies facilitate towards making the material mix processable. The optimum results are obtained by appropriate distribution and mix of the low and medium viscosity of the individual resins.

In accordance with the present disclosure, the at least one slip additive present in the sealant product side layer can be selected from the group consisting of erucamide and oleamide. The amount of at least one slip additive that can be used is in the range of 0.01 wt % to 10 wt % of the sealant product side layer. Due to the presence of the at least one slip additive, the sealant product side layer offers a co-efficient of friction in the range of 0.1 to 0.6.

The main function of the sealant product side layer is sealability. In a preferred embodiment, the sealant product side layer comprises three blends. In a particular embodiment, the three blends present in the sealant product side layer can be in the proportion of 70:20:10 by weight.

The function of the intermediate layer, mainly, is to provide structural stability to the biodegradable and compostable multilayer film. It is the backbone of the film. In an embodiment, the intermediate layer can consist of 100% of the first blend. In another embodiment, the intermediate layer can consist of the first blend and the second blend in a proportion of 90:10 wt %. The designed molecular structure of the intermediate layer controls the migration of the slip additive in a manner so as to retain the slip additive in the sealant product side layer without allowing its migration to the outer surface layer thereby ensuring the desired coefficient of friction in the sealant product side layer.

In accordance with the present disclosure, the number of intermediate layers disposed between the outer surface layer and the sealant product side layer can be in the range of 1 to 9.

The function of the outer surface layer is to enable itself to get affixed on to any other layer (typically, paper, aluminum, Biaxially Oriented Polypropylene (BOPP), PET, metallized PET or similar substrates). In a preferred embodiment, the outer surface layer comprises three blends. In a particular embodiment, the three blends present in the outer surface layer can be in the proportion of 70:20:10 by weight.

In accordance with the present disclosure, the thickness of the biodegradable and compostable multilayer film can be in the range of 12 µm to 300 µm.

Further, the biodegradable and compostable multilayer film of the present disclosure can additionally comprise a metallized layer having a thickness in the range of 10 μm to 50 μm laminated over the outer surface layer.

In accordance with the present disclosure, the metal of the metallized layer is aluminum.

In a preferred embodiment, the biodegradable and compostable multilayer film has three layers. FIG. 1 illustrates a schematic cross sectional view of a three layer biodegradable and compostable film of the present disclosure with an intermediate layer (I), a sealant product side layer (S) and an outer surface layer (O). Each layer comprises at least one blend independently selected from the group consisting of a first blend of polylactic acid and a copolyester of 1,4-butanediol, adipic acid, and terephthalic acid, a second blend of polylactic acid and a copolyester of 1,4-butanediol, adipic acid, and terephthalic acid, a third blend of polylactic acid and a copolyester of 1,4-butanediol, adipic acid and terephthalic acid, a fourth blend of polylactic acid and a copolyester of 1,4-butanediol, adipic acid, and terephthalic acid, a fifth blend of polylactic acid and a copolyester of 1,4-butanediol, adipic acid and terephthalic acid and a sixth blend of polylactic acid and a copolyester of 1,4-butanediol, adipic acid, and terephthalic acid, in a way that the multilayer film comprises at least two layers each having separately at least one of the aforementioned blends in an amount in the range of 1 wt % to 99 wt %.

FIG. 2 illustrates a schematic cross sectional view of a three layer biodegradable and compostable film of the present disclosure with an intermediate layer (I), a sealant product side layer (S), and an outer surface layer (O), showing the compositional elements of each of the layers, wherein 1 represents the first blend, 2 represents the second blend and 3 represents the slip additive.

In another aspect of the present disclosure, there is provided a process for manufacturing the biodegradable and compostable multilayer film. The biodegradable and compostable multilayer film of the present disclosure can be prepared by at least one process selected from the group consisting of blown-film co-extrusion, cast film co-extrusion, and hot lamination.

For the manufacturing of the biodegradable and compostable multilayer film of the present disclosure, at least one blend independently selected from the group consisting of a first blend of polylactic acid and a copolyester of 1,4-butanediol, adipic acid, and terephthalic acid, a second blend of polylactic acid and a copolyester of 1,4-butanediol, adipic acid and terephthalic acid, a third blend of polylactic acid and a copolyester of 1,4-butanediol, adipic acid, and terephthalic acid, a fourth blend of polylactic acid and a copolyester of 1,4-butanediol, adipic acid, and terephthalic acid, a fifth blend of polylactic acid and a copolyester of 1,4-butanediol, adipic acid, and terephthalic acid and a sixth blend of polylactic acid and a copolyester of 1,4-butanediol, adipic acid, and terephthalic acid can be used as resin material wherein, the first blend has a melt temperature in the range of 165° C. to 190° C.; the second blend has a melt temperature in the range of 190° C. to 200° C.; the third blend has a melt temperature in the range of 165° C. to 170° C.; the fourth blend has a melt temperature in the range of 180° C. to 190° C.; the fifth blend has a melt temperature in the range of 175° C. to 195° C.; and the sixth blend has a melt temperature in the range of 180° C. to 200° C. The amounts of blends are used in a way that the multilayer film comprises at least two layers each having separately at least one of the aforementioned blends in an amount in the range of 1 wt % to 99 wt %.

A sealant product side layer extruder, an outer surface layer extruder and at least one intermediate extruder can be used for extruding the sealant product side layer, the outer surface layer and at least one intermediate layer respectively. At least one blend independently selected the group of the first blend, the second blend, the third blend, the fourth blend, the fifth blend, and the sixth blend is introduced through each of the sealant product side layer extruder, outer surface layer extruder, and at least one intermediate layer extruder. In addition, at least one slip additive selected from the group consisting of erucamide and oleamide is also introduced into the sealant product side extruder. Thereafter, the sealant product side layer extruder, an outer surface layer extruder, and at least one intermediate extruder are heated to a predetermined temperature ranging from 140° C. to 210° C. for blown film co-extrusion and 130° C. and 300° C. for cast film co-extrusion followed by extruding to obtain a sealant product side layer extrudate, an outer surface layer extrudate, and at least one intermediate layer extrudate from the respective extruder. The extrudates, so obtained, are passed through a die to form a multilayer biodegradable and compostable extrudates. The multilayer extrudates are cooled to a temperature in the range of 5° C. to 40° C. to obtain the biodegradable and compostable multilayer film.

In accordance with one embodiment of the present disclosure, the blown film co-extrusion process is used for manufacturing the biodegradable and compostable multilayer film.

In one embodiment of the blown film co-extrusion process of the present disclosure, a three layer biodegradable and compostable film is manufactured.

Co-extrusion is a process wherein more than one extruder is used and the number of extruders depends on the number of individual layers present in the multilayer film structure.

Three separate extruders, a sealant product side layer extruder, an outer surface layer extruder and an intermediate layer extruder are employed. The extruders used in the process of the present disclosure can have screws selected from high performance screws (HPS), barrier screws, high mixing/shear screws, and low shear screws. Preferably, extruders having low shear screws called LT screws are used. As all the six blends comprise low melt strength resins, the use of such low shear screws is desirable.

At least one of a first blend of polylactic acid and a copolyester of 1,4-butanediol, adipic acid and terephthalic acid, a second blend of polylactic acid and a copolyester of 1,4-butanediol, adipic acid, and terephthalic acid, a third blend of polylactic acid and a copolyester of 1,4-butanediol, adipic acid, and terephthalic acid, a fourth blend of polylactic acid and a copolyester of 1,4-butanediol, adipic acid, and terephthalic acid, a fifth blend of polylactic acid and a copolyester of 1,4-butanediol, adipic acid, and terephthalic acid and a sixth blend of polylactic acid and a copolyester of 1,4-butanediol, adipic acid, and terephthalic acid can be used as resin material for preparing the three layer biodegradable and compostable film.

In the intermediate layer extruder, 100% of the first blend can be melt mixed by heating the first extruder to obtain a first melt. In the outer surface layer extruder a mixture of 70 wt % of the first blend, 20 wt % of the second blend, and 10 wt % of the sixth blend are melt mixed by heating the second extruder to obtain a second melt. In sealant product side layer extruder, a mixture of 70 wt % of the first blend, 10 wt % of the second blend, 10 wt % of the third blend, and 10 wt % of the slip additive are melt mixed by heating the third extruder to obtain a third melt. The third melt, comprising the slip additive, forms the sealant product side layer of the three layer biodegradable and compostable film. The amount of slip additive used can be in the range of 0.01 wt % to 10 wt % of the sealant product side layer of the three layer biodegradable and compostable film. A typical slip additive is erucamide. Other possible slip additives like oleamide are also envisaged. These first, second, and third melts are extruded through the intermediate layer extruder, the outer surface layer extruder and the sealant product side layer extruder respectively to obtain respective extrudates i.e. the intermediate layer extrudate, the outer surface layer extrudate, and the sealant product side layer extrudate.

The intermediate layer extrudate, outer surface layer extrudate, and sealant product side layer extrudate are co-extruded by passing them through a die to obtain the three layer biodegradable and compostable tubular extrudate which is cooled at a temperature in the range of 10° C. to 40° C. to obtain three layer biodegradable and compostable film. The co-extrusion is configured in a way that the intermediate layer extrudate is laid over the outer surface layer extrudate and the sealant product side layer extrudate is laid over the intermediate layer extrudate to result in the three layer tubular extrudate with sealant product side layer extrudate comprising the slip additive.

In accordance with the process of the present disclosure, the intermediate layer extrudate, outer surface layer extrudate, and sealant product side layer extrudate are passed through at least one die selected from the group consisting of co-extrusion stack type die and spiral die.

In a second embodiment of the blown film co-extrusion process of the present disclosure, a five layer biodegradable and compostable film is manufactured.

In addition to the sealant product side layer extruder and outer surface layer extruder, three intermediate layer extruders are used as a first intermediate layer extruder, a second intermediate layer extruder, and a third intermediate layer extruder. In the first intermediate layer extruder, the second intermediate layer extruder, and the third intermediate layer extruder, 100% of the fourth blend can be mixed separately and heated to obtain a first melt, a second melt and a third melt, respectively. In the outer surface layer extruder, a mixture of 70 wt % of the fourth blend, 20 wt % of the second blend, and 10 wt % of the sixth blend are mixed and heated to obtain a fourth melt. In the sealant product side layer extruder, a mixture of 70 wt % of the fourth blend, 10 wt % of the second blend, 10 wt % of the third blend, and 10 wt % of the slip additive are mixed and heated to obtain a fifth melt. This fifth melt comprising the slip additive forms the sealant product side layer of the five layer biodegradable and compostable film. The slip additive is taken in amounts such that the amount of the slip additive can be in the range of 0.01 wt % to 10 wt % of the sealant product side layer of the five layer biodegradable and compostable film. A typical slip additive is erucamide. Other possible slip additives like oleamide are also envisaged. The first melt, the second melt, and the third melt are extruded through the first intermediate layer extruder, the second intermediate layer extruder, and the third intermediate layer extruder respectively to obtain the respective extrudates, i.e. the first intermediate layer extrudate, the second intermediate layer extrudate, and the third intermediate layer extrudate. Remaining fourth and fifth melts are extruded through the outer surface layer extruder and the sealant product side layer extruder separately to obtain the outer surface layer extrudate and the sealant product side layer extrudate respectively. These extrudates are then co-extruded by passing them through a die to obtain the five layer biodegradable and compostable tubular extrudate. The co-extrusion is configured in a way that the first intermediate layer extrudate is laid over the sealant product side layer extrudate, the second intermediate layer extrudate is laid over the first intermediate layer extrudate, the third intermediate layer extrudate is laid over the second intermediate layer extrudate, and the outer surface layer extrudate is laid over the third intermediate layer extrudate to result in the five layer biodegradable and compostable tubular extrudate with the fifth melt, which comprises the slip additive, forming the sealant product side layer and the fourth melt forming the outer surface layer. The intermediate layer of the tubular extrudate comprises three layers, first intermediate layer extrudate, second intermediate layer extrudate, and third intermediate layer extrudate of the first melt, the second melt, and the third melt respectively.

Typically, the multilayer tubular extrudate is extruded upward. However, horizontal or downward extrusion can be carried out for preparing the biodegradable and compostable multilayer film of the present disclosure.

In the upward extrusion technique, cold filtered air is blown from the bottom through the center of the die and supplemented by cold air blown on the bottom and lower side of the blown film using a dual lip air cooling ring. The cold filtered air from the center inflates the multilayer tubular extrudate causing it to expand and form a bubble. It is essential for the cold air to be filtered before introducing it to inflate the multilayer tubular extrudate as the particulate matter in the air may contaminate the bubble with specks. It may even result in tearing away of the low melt strength multilayer film. By controlling the pressure of the cold filtered air, the size of the bubble, and hence, the thickness of the multilayer film to be formed is controlled. The temperature of the cold air blown from the center can be in the range of 8° C. to 20° C. The temperature of the cold air through the dual lip air cooling ring can be in the range of 8° C. to 40° C. which is adjusted depending upon the ambient temperature conditions. The dual lip air cooling ring is an indispensable part of the blown film co-extrusion process of the present disclosure as the process involves melt processing resins having low melt strength. The use of dual lip air cooling ring is to ensure a low pressure, high volume air flow to increase the cooling efficiency, and the dimensional stability of the bubble as well as optical properties of the multilayer film.

The rising bubble on cooling further releases particulate waxy resinous material from the operative inner side of the bubble. These particulates may fall off and deposit on the inside of the die and may also contaminate the inner surface of the bubble. To ensure that the waxy particulate material is removed effectively, there is a special wax collector located in the center of the die just above the cold air inlet and circulation system. In an embodiment, the wax collector can be in the form of a cylindrical drum with a special filter in the center of the die just above the cold air inlet and circulation system. The central cold air circulation leads to condensation and suction action which results in the waxy particulate matter to get deposited on the wax collector. Other possible means to remove the resulting waxy resinous material are also envisaged.

Biaxial stretching of the blown-film bubble is important to achieve uniformity in the properties of the resultant multilayer film. The blowing of cold air results in the increase of the bubble diameter till it reaches the maximum or an optimized value. At this point, the cooled film is being stretched primarily in the transverse direction. The cooled film retains the transverse orientation achieved as it opposes the relaxation of the polymeric resin oriented in the transverse direction. The transversely stretched bubble is further guided up towards nip rollers with the help of guide rollers. At the nip rollers, the bubble is flattened to obtain a flattened multilayer tubular film. Because of the pulling action of the nip rollers, the rising bubble experiences a stretching in the machine direction. Care has to be taken that the rising bubble is appropriately cooled enough to retain the transverse orientation before being stretched in the machine direction. This biaxial stretching ensures gauge uniformity of the final multilayer film.

The biaxially stretched flattened multilayer tubular film can then be passed through a series of multi-angular flattening devices to obtain a biaxially stretched uniformly flattened multilayer tubular film. The multi-angular flattening devices are fitted to overcome any thickness variation across the breadth of the biaxially stretched flattened multilayer tubular film. These flattening devices are useful in avoiding any shrinkage defects or wrinkle defects arising in the film. The bi-axially stretched uniformly flattened multilayer tubular film can then be passed through a rotating haul off system for gauge randomization. The flattened multilayer tubular film obtained from the gauge randomizing haul off system is slit open, unfolded and further slit into proper widths as per requirement. The slit open film is the biodegradable and compostable multilayer film of the present disclosure. The flattened multilayer tubular film when slit open results in a set of two multilayer films which are separately pulled off using 'haul-off' rollers and finally wound on a winder with the side comprising the slip additive on the inside.

The winder can be a low tension winder, called the gap winder, to prevent the film from tearing away during winding. Conventional contact or surface winders, when used for winding the low melt strength biodegradable and compostable multilayer film, taint the quality of the film and therefore are not employed in the present disclosure.

In an embodiment of the blown film co-extrusion process of the present disclosure, a metallized layer is laminated over the outer surface layer of the biodegradable and compostable multilayer film of the present disclosure. In a further embodiment, the thickness of the metallized layer is in the range of 10 μm to 50 μm. In a particular embodiment, the metallized layer comprises a continuous aluminum foil.

In another embodiment of the blown film co-extrusion process of the present disclosure, a paper-layer is laminated over the outer surface layer and the sealant product side layer of the biodegradable and compostable multilayer film of the present disclosure. In a further embodiment, the thickness of the paper-layer is in the range of 10 gsm to 100 gsm.

The thickness of the multilayer film prepared by the blown film co-extrusion process of the present disclosure can be in the range of 12 μm to 300 μm.

In accordance with another embodiment of the process of the present disclosure, cast film co-extrusion process is disclosed for manufacturing the biodegradable and compostable multilayer film.

At least one of a first blend of polylactic acid and a copolyester of 1,4-butanediol, adipic acid and terephthalic acid, a second blend of polylactic acid and a copolyester of 1,4-butanediol, adipic acid, and terephthalic acid, a third blend of polylactic acid and a copolyester of 1,4-butanediol, adipic acid, and terephthalic acid, a fourth blend of polylactic acid and a copolyester of 1,4-butanediol, adipic acid, and terephthalic acid, a fifth blend of polylactic acid and a copolyester of 1,4-butanediol, adipic acid, and terephthalic acid and a sixth blend of polylactic acid and a copolyester of 1,4-butanediol, adipic acid, and terephthalic acid can be used as resin material for preparing the biodegradable and compostable multilayer film of the present disclosure.

Similar to the blown film co-extrusion process of the present disclosure, the cast film co-extrusion process of the present disclosure, too, can employ a co-extrusion technique with a number of extruders to prepare a multilayer cast film co-extrusion process film extrudate. One side of the multilayer film extrudate comprises the slip additive. The extruders used in the process of the present disclosure can have screws selected from high performance screws (HPS), barrier screws, high mixing/shear screws, and low shear screws. Preferably, extruders having low shear screws called LT screws are used.

The multilayer film extrudate obtained from the cast film co-extrusion process is cooled over a large moving polished metal roller which can be maintained at a temperature in the range of 5° C. to 40° C. depending upon the ambient temperature conditions. After cooling, the cooled multilayer film extrudate can further be passed over one or more auxiliary cooling rollers to obtain the multilayer film of the present disclosure after which the multilayer film is pulled over using a set of 'haul-off' rollers and can be wound using a low tension winder, called the gap winder. The multilayer film is wound in such a way that the side comprising the slip additive is on the inner side.

In accordance with an embodiment of the cast film co-extrusion process of the present disclosure, the multilayer film is a three layer biodegradable and compostable film.

In accordance with another embodiment of the cast film co-extrusion process of the present disclosure, the multilayer film is a five layer biodegradable and compostable film.

The thickness of the multilayer film prepared by cast film co-extrusion process of the present disclosure can be in the range of 12 μm to 300 μm.

In an embodiment of the present disclosure, a metallized layer is laminated over the outer surface layer of the five layer film prepared by the cast film co-extrusion process. In a particular embodiment, the metallized layer comprises a continuous aluminum foil. In a further embodiment, the metallized layer can be of thickness in the range of 6 μm to 50 μm.

In another embodiment of the present disclosure, a paper-layer is laminated over the outer surface layer and the sealant product side layer of the five layer film prepared by the cast film co-extrusion process. In a further embodiment, the thickness of the paper layer can be in the range of 10 gsm to 100 gsm.

The biodegradable and compostable multilayer film of the present disclosure is suitable to be used as a packaging material for tobacco based products and as a packaging material in pharmaceutical and food industry. In a typical processed foods manufacturing plant, a form fill sealing machine is used for continuously filling and sealing between packs. The form fill sealing machine can be vertical, inclined or horizontal one. The form filling machine, generally, has a capacity in the range of 10 to 3000 packs per minute.

The metallized layer or paper layer attached on the multilayer film of the present disclosure can be easily peeled off and recycled. The multilayer film of the present disclosure can then be subjected to composting. The multilayer film of the present disclosure can be composted within 90 days. This renders the multilayer film of the present disclosure eco-friendly as all the constituents can be either composted or recycled.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTS

Experiment 1: Preparation of a Biodegradable and Compostable Multilayer Film in Accordance with the Present Disclosure A biodegradable and compostable multilayer film, Film-1, having a thickness of 24 micron and width of 870 mm was prepared. Blends comprising polylactic acid and a copolyester of 1,4-butanediol, adipic acid, and terephthalic acid were used as resin material. For the melt mixing of these blends, a sealant product side layer extruder, an outer surface layer extruder, and an intermediate layer extruder were employed. In the intermediate layer extruder, a first blend was melt mixed at a temperature of 187° C. to obtain a first melt. In the outer surface layer extruder, blends were melt mixed at a temperature of 197° C. to obtain a second melt. In the sealant product side layer extruder, blend along with erucamide as slip additive were melt mixed at a temperature of 197° C. to obtain a third melt. The first, the second, and the third melts were extruded separately to obtain an intermediate layer extrudate, an outer surface layer extrudate, and a sealant product side layer extrudate respectively. These extrudates were then passed through a co-extrusion stack type die head in such a way that the intermediate layer extrudate was laid over the sealant product side layer extrudate and the outer surface layer extrudate was laid over the intermediate layer extrudate to result in the multilayer film extrudate with the third melt comprising the slip additive forming the sealant product side layer and the second melt forming the outer surface layer. The first melt forms the intermediate layer of the multilayer film extrudate.

This multilayer film extrudate was then cooled at a temperature of 25° C. to obtain a biodegradable and compostable multilayer film.

Further, another biodegradable and compostable multilayer film, Film-2, having a thickness of 15 micron and width of 870 mm was prepared using the same process steps and machinery as described above. These biodegradable and compostable films, Film-1 and Film-2 were then tested for their film and mechanical properties and the data so obtained is tabulated herein Table 1 below.

TABLE 1

Film and the Mechanical properties of biodegradable and compostable Film-1 and Film-2:

| S. No. | Film properties/ Mechanical properties | Unit | Film-1 (20μ/870 mm) | Film-2 (15μ/870 mm) |
|---|---|---|---|---|
| 1. | Thickness | micron | 20 | 15 |
| 2. | Grammage | GSM | 24 | 18 |
| 3. | Treatment | dyne/cm | 42 | 42 |
| 4. | Heat seal strength | Kg/15 mm | 0.882 | 0.696 |
| 5. | C.O.F. (film/m) | kinetic | 0.21 | 0.24 |
| 6. | C.O.F. (film/film) | kinetic | 0.09 | 0.15 |
| 7. | Tensile strength | MD (Kg/cm$^2$) | 440 | 342 |
|  |  | TD (Kg/cm$^2$) | 285 | 165 |
| 8. | Elongation | MD(%) | 242 | 234 |
|  |  | TD (%) | 312 | 277 |

MD: Machine direction;
TD: Transversal direction;
C.O.F. = coefficient of friction Form the above data, it is evident that the biodegradable and compostable multilayer film of the present disclosure has significant film and mechanical properties which make it suitable/processable for further use such as packaging of tobacco, food and pharmaceutical products/items.

Experiment 2

Experiment 2a: Preparation of Three Layer Biodegradable and Compostable Film in Accordance with the Present Disclosure A three layer biodegradable and compostable film was prepared. A first, second, and a third blend comprising polylactic acid and a copolyester of 1,4-butanediol, adipic acid, and terephthalic acid were used as resin material. Three different extruders, a sealant product side layer extruder, an outer surface layer extruder, and an intermediate layer extruder were employed for melt mixing of the blends. In the intermediate layer extruder, 100% of the first blend was melt mixed at a temperature of 187° C. to obtain a first melt. In the outer surface layer extruder, 70% of the first blend, 20% of the second blend, and 10% of the third blend were melt mixed at a temperature of 197° C. to obtain a second melt. In the sealant product side layer extruder, 97.5% of the first blend and 2.50% of erucamide as slip additive were melt mixed at a temperature of 197° C. to obtain a third melt. The first, the second, and the third melt were extruded separately in their respective extruders to obtain an intermediate layer extrudate, an outer surface layer extrudate, and a sealant product side layer extrudate. These extrudates were then passed through a co-extrusion stack type die head. The co-extrusion was configured in a way that the intermediate layer extrudate was laid over the sealant product side layer extrudate and the outer surface layer extrudate was laid over the intermediate layer extrudate to result in the three layer film extrudate with the third melt comprising the slip additive forming the sealant product side layer and the second melt forming the outer surface layer. The first melt forms the intermediate layer of the three layer film extrudate.

Three layer film extrudate was then cooled at a temperature in the range of 8° C. to 40° C. to obtain the three layer biodegradable and compostable film.

Experiment 2b: Mechanical Properties and the Film Properties of the Three Layer Biodegradable and Compostable Film The three layer biodegradable and compostable film, so obtained, was tested for the mechanical properties like tensile strength and elongation. Further, the co-efficient of friction of the sealant product side layer was also tested. Each test was repeated 5 times to get the more accurate data. The results are tabulated herein Table 2 below.

TABLE 2

Film properties of the three layer biodegradable and compostable film

| S. No. | Film properties | Unit | Trials | | | | | |
|---|---|---|---|---|---|---|---|---|
| | | | 1 | 2 | 3 | 4 | 5 | Avg. |
| 1. | Thickness | micron | 25 | 27 | 25 | 26 | 25 | 25.6 |
| 2. | Grammage | gm/m² | 30 | 32 | 31 | 30 | 31 | 30.8 |
| 3. | Corona Treatment | dyne/cm | 44 | 44 | 44 | 44 | 44 | 44 |
| 4. | C.O.F. (film/m) | static | 0.34 | 0.3 | 0.3 | 0.29 | 0.3 | 0.31 |
| | | kinetic | 0.22 | 0.17 | 0.22 | 0.17 | 0.18 | 0.19 |
| 5. | C.O.F. (film/film) | static | 0.15 | 0.11 | 0.14 | 0.15 | 0.12 | 0.13 |
| | | kinetic | 0.13 | 0.1 | 0.12 | 0.13 | 0.12 | 0.12 |
| 6. | Heat seal strength | Kg/15 mm | 1.36 | 1.26 | 1.29 | 1.24 | 1.28 | 1.29 |

C.O.F. = coefficient of friction

From Table 2 it is observed that the static and kinetic average coefficient of friction (film/m) of the sealant product side layer of the three layer biodegradable and compostable film was 0.306 and 0.192 respectively. Also, the static and kinetic average coefficient of friction for (film/film) was 0.134 and 0.12 respectively. These values suggest that the three layer film of the present disclosure can offer a friction which makes it suitable for packaging. Also, such values of coefficient of friction are desirable so as to improve handling and winding properties of the film during manufacture and use, and to prevent blocking during storage. The heat seal strength of the three layer film is also in compliance with good packaging of the coarser tobacco based products and as a packaging material in pharmaceutical and food industry.

TABLE 3

Mechanical properties of the three layer biodegradable and compostable film

| S. No. | Mechanical property | Unit | Trials | | | | | |
|---|---|---|---|---|---|---|---|---|
| | | | 1 | 2 | 3 | 4 | 5 | Avg. |
| 1. | Tensile strength at break | MD (kg/cm²) | 371.84 | 314.12 | 352.21 | 361.14 | 325.26 | 350.31 |
| | | TD (kg/cm²) | 278.24 | 284.11 | 172.52 | 214.12 | 189.21 | 227.64 |
| 2. | Elongation at break | MD (kg/cm²) | 183.32 | 185.21 | 262.72 | 279.23 | 299.61 | 242.12 |
| | | TD (kg/cm²) | 373.62 | 314.12 | 341.44 | 339.67 | 351.19 | 344.01 |

MD: Machine direction;
TD: Transversal direction

From the mechanical properties, as provided in Table 3, it is evident that the tensile strength and the force required for breaking the film on elongation or elongation at break are well in compliance with packaging and storing of the coarser tobacco based products and as a packaging material in pharmaceutical and food industry.

Experiments 3 to 6: Mechanical Properties and Film Properties of the Biodegradable and Compostable Multilayer Films Further, Experiments 3 to 6 were performed using the same experimental procedure as used for Experiment 2a for manufacturing the three layer biodegradable and compostable film. Four different films were prepared and were tested for their film properties. Each test was repeated 5 times and the average results of the parameters are tabulated herein Table 4 below.

TABLE 4

Film properties of the three layer biodegradable and compostable films

| S. No. | Film property | Unit | Experiment | | | |
|---|---|---|---|---|---|---|
| | | | 3 | 4 | 5 | 6 |
| 1. | Thickness | micron | 25.6 | 25.4 | 25.4 | 26.4 |
| 2. | Grammage | gm/m² | 31.6 | 30.6 | 31.4 | 31.4 |
| 3. | Treatment | dyne/cm | 44 | 44 | 44 | 44 |
| 4. | C.O.F. (film/m) | static | 0.27 | 0.27 | 0.26 | 0.28 |
| | | kinetic | 0.26 | 0.226 | 0.232 | 0.27 |
| 5. | C.O.F. (film/film) | static | 0.18 | 0.21 | 0.14 | 0.16 |
| | | kinetic | 0.17 | 0.19 | 0.13 | 0.14 |
| 6. | Heat seal strength | Kg/15 mm | 1.33 | 1.25 | 1.21 | 1.25 |

C.O.F. = coefficient of friction

Further, the mechanical properties of these three layer biodegradable and compostable multilayer films obtained from the Experiments 3 to 6, were tested and the data so obtained is tabulated herein Table 5 below.

TABLE 5

Mechanical properties of the three layer biodegradable and compostable

| S. No. | Film property | Unit | Experiment 3 | 4 | 5 | 6 |
|---|---|---|---|---|---|---|
| 1. | Tensile strength at break | MD (kg/cm$^2$) | 338.64 | 387.65 | 401.95 | 385.16 |
| | | TD (kg/cm$^2$) | 191.78 | 241.35 | 231.77 | 266.11 |
| 2. | Elongation at break | MD (kg/cm$^2$) | 215.57 | 221.23 | 248.99 | 242.17 |
| | | TD (kg/cm$^2$) | 228.50 | 364.08 | 328.18 | 414.83 |

MD: Machine direction;
TD: Transversal direction

As evident from the data in Table 4 and Table 5, improvement in the mechanical properties as well as in the film properties of the three layer biodegradable and compostable film obtained from Experiment 3 to 6 is observed as compared to the three layer biodegradable and compostable film of Experiment 2b. Therefore, the multilayer films of the present disclosure consistently show significant film and mechanical properties which make them suitable for the packaging and storing of the coarser tobacco based products and also as a packaging material in the pharmaceutical and food industry.

Technical Advancements

The present disclosure described herein above has several technical advantages including, but not limited to, the realization of a biodegradable and compostable multilayer film that:

is useful as a packaging material for tobacco based products; and as a packaging material in pharmaceutical and food industry; and is non-reactive with the contents of the package.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A biodegradable and compostable multilayer film having a thickness in the range of 12 µm to 300 µm comprising:
   a sealant product side layer:
      comprising at least one slip additive; and
      having a pre-determined co-efficient of friction;
   an outer surface layer; and
   at least one intermediate layer disposed between said sealant product side layer and said outer surface layer;
      wherein, each of said sealant product side layer, said outer surface layer and said at least one intermediate layer comprises a blends having the density in the range of 1.22 to 1.28 gm per cc, said blends independently selected from the group consisting of:
         a first blend of polylactic acid and a copolyester of 1,4-butanediol, adipic acid, and terephthalic acid, wherein said first blend having a melt temperature in the range of 165° C. to 190° C.;
         a second blend of polylactic acid and a copolyester of 1,4-butanediol, adipic acid, and terephthalic acid, wherein said second blend having a melt temperature in the range of 190° C. to 200° C.;
         a third blend of polylactic acid and a copolyester of 1,4-butanediol, adipic acid, and terephthalic acid, wherein said third blend having a melt temperature in the range of 165° C. to 170° C.;
         a fourth blend of polylactic acid and a copolyester of 1,4-butanediol, adipic acid, and terephthalic acid, wherein said fourth blend having a melt temperature in the range of 180° C. to 190° C.;
         a fifth blend of polylactic acid and a copolyester of 1,4-butanediol, adipic acid, and terephthalic acid, wherein said fifth blend having a melt temperature in the range of 175° C. to 195° C.; and
         a sixth blend of polylactic acid and a copolyester of 1,4-butanediol, adipic acid, and terephthalic acid, wherein said sixth blend having a melt temperature in the range of 180° C. to 200° C.,
   in a way that said biodegradable and compostable multilayer film comprises at least three layers each having separately at least one of said blends in an amount in the range of 1 wt % to 99 wt %, wherein said sealant product side layer comprises any three blends present in the proportion of 70:20:10 by weight percent, said intermediate layer comprises said first and said second blend in the proportion of 90:10 by weight percent and said outer surface layer comprises any three blends present in the proportion of 70:20:10 by weight percent for extrusion on three different extruders.

2. The biodegradable and compostable multilayer film as claimed in claim 1, wherein said slip additive is selected from the group consisting of erucamide and oleamide.

3. The biodegradable and compostable multilayer film as claimed in claim 1, wherein the amount of said at least one slip additive present in said sealant product side layer is in the range of 0.01 wt % to 10 wt %.

4. The biodegradable and compostable multilayer film as claimed in claim 1, wherein said predetermined co-efficient of friction of said sealant product side layer is in the range of 0.1 to 0.6.

5. The biodegradable and compostable multilayer film as claimed in claim 1, further comprises a metallized layer having a thickness in the range of 10 μm to 50 μm laminated over said outer surface layer.

6. The biodegradable and compostable multilayer film as claimed in claim 5, wherein the metal of said metallized layer is aluminum.

7. The biodegradable and compostable multilayer film as claimed in claim 1, wherein the number of said intermediate layers disposed between said outer surface layer and said sealant product side layer is two.

8. The biodegradable and compostable multilayer film as claimed in claim 1, wherein the number of said intermediate layers disposed between said outer surface layer and said sealant product side layer is three.

9. A process for manufacturing said biodegradable and compostable multilayer film as claimed in claim 1, wherein said process is at least one selected from the group consisting of blown-film co-extrusion, cast film co-extrusion and hot lamination.

10. A process for manufacturing said biodegradable and compostable multilayer film as claimed in claim 1, said process comprising:
   providing
      a sealant product side layer extruder for extruding said sealant product side layer therethrough;
      an outer surface layer extruder for extruding said outer surface layer therethrough; and
      at least one intermediate layer extruder for extruding said at least one intermediate layer therethrough;
   introducing at least one blend independently selected the group of said first blend, second blend, third blend, fourth blend, fifth blend, and sixth blend through each of said sealant product side layer extruder, said outer surface layer extruder, and said at least one intermediate layer extruder;
   wherein, said at least one slip additive selected from the group consisting of erucamide and oleamide is also introduced in said sealant product side layer extruder;
   heating said sealant product side layer extruder, said outer surface layer extruder, and said at least one intermediate layer extruder to a predetermined temperature and extruding a sealant product side layer extrudate, an outer surface layer extrudate, and at least one intermediate layer extrudate through said sealant product side layer extruder, said outer surface layer extruder, and said at least one intermediate layer extruder respectively and allowing said sealant product side layer extrudate, said outer surface layer extrudate, and said at least one intermediate layer extrudate to pass through a die to form a multilayer biodegradable and compostable extrudate; and
   cooling said multilayer biodegradable and compostable extrudate to a temperature in the range of 5° C. to 40° C. to obtain said biodegradable and compostable multilayer film.

11. The process as claimed in claim 10, wherein said predetermined temperature is in the range of 140° C. to 210° C. for blown film co-extrusion.

12. The process as claimed in claim 10, wherein said predetermined temperature is in the range of 130° C. to 300° C. for cast film co-extrusion.

13. The process as claimed in claim 10, wherein said die is at least one selected from the group consisting of co-extrusion STACK TYPE die and spiral die.

* * * * *

UNITED STATES PATENT AND TRADEMARK OFFICE
CERTIFICATE OF CORRECTION

PATENT NO. : 11,260,625 B2
APPLICATION NO. : 16/303620
DATED : March 1, 2022
INVENTOR(S) : Prakash Rasiklal Dhariwal, Milind Ganesh Bhole and Sharad Shrikant Kulkarni It is certified that error appears in the above-identified patent and that said Letters Patent is hereby corrected as shown below:

In the Claims

Column 18, Line 18 Claim 1 change, "layer comprises a blends having the density" to --layer comprises blends having the density--

Signed and Sealed this
Twenty-third Day of August, 2022

Katherine Kelly Vidal
*Director of the United States Patent and Trademark Office*